Sept. 24, 1935.  W. F. DRAY  2,015,395
SPRAY PIPE
Original Filed March 30, 1934

Inventor
William F. Dray
By Nathaniel Frucht
his Attorney

Patented Sept. 24, 1935

2,015,395

UNITED STATES PATENT OFFICE 2,015,395

SPRAY PIPE

William F. Dray, East Providence, R. I., assignor to Davol Rubber Company, a corporation of Rhode Island Original application March 30, 1934, Serial No. 718,253. Divided and this application July 27, 1934, Serial No. 737,230

3 Claims. (Cl. 299—114)

This application is a division of my application Serial No. 718,253, filed March 30, 1934 for Rubber articles and the manufacture thereof.

My present invention relates to the manufacture of rubber articles, and has particular reference to the construction of spray pipes for whirling sprays and syringes.

The spray pipes now in use are designed to produce a spiral or helical flow of the fluid emerging from the tips, in order to obtain a cleansing whirl. The pipe structure has therefore included a helically formed central member for guiding the fluid flow into a tortuous path; and the present mode of manufacture has utilized a separate tip piece into which the helically formed central member is forced, the tip piece then being secured to the pipe shank in any suitable manner, as by threaded engagement. The present construction thus has at least three separate parts, which must be separately formed and assembled.

It is the principal object of my invention to form a spray pipe having a helical passageway in one piece, thus simplifying the manufacture, reducing the cost, eliminating assembly operations, and preventing separation of the pipe parts due to shrinkage, looseness of thread connections, or other causes.

With the above and other objects and advantageous features in view, my invention consists of a novel product, more fully disclosed in the detailed description following in conjunction with the accompanying drawing, and more specifically defined in the claims appended thereto.

Figure 1:
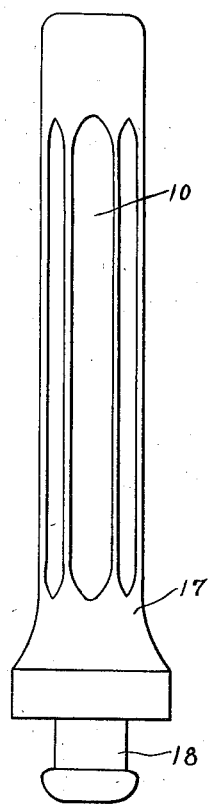
Fig. 1 is an elevation of one design of the novel syringe pipe.
Figure 2:
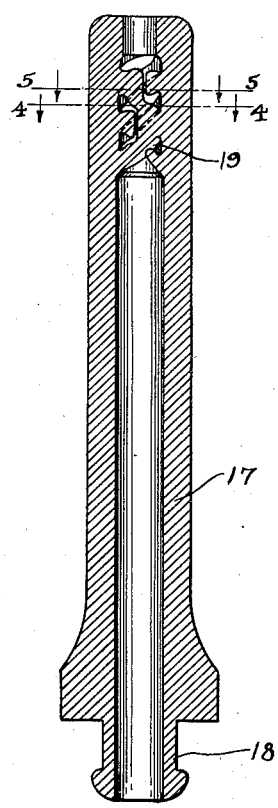
Fig. 2 is a central vertical section therethrough.
Figure 3:
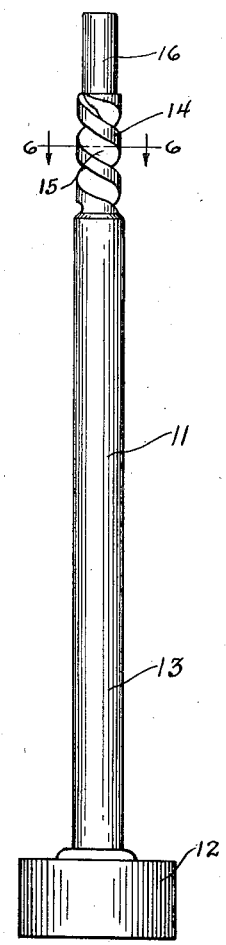
Fig. 3 is an elevation of the novel core.
Figure 4:
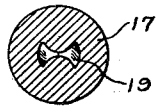
Figure 5:
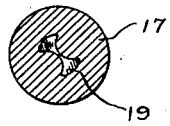
Figure 6:
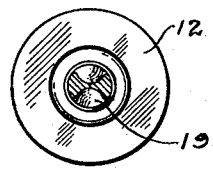

Figs. 4 and 5 are sections on the lines 4—4 and 5—5 of Fig. 1;

Fig. 6 is a section through Fig. 3, and

Figure 7:
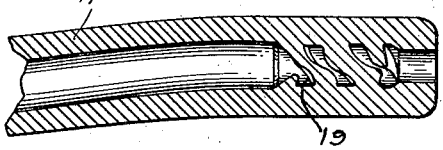

Fig. 7 is a fragmentary sectional view of a modified construction of syringe pipe.

The manufacture of rubber goods such as spray pipes includes a molding operation, followed by a curing operation, the molded article being soft and resilient and the cured article being hard and lacking in resilience. I have found that the soft and resilient qualities of the molded article permit molding over a core which has recesses or entrant portions, the core being then removable by distorting the molded article.

Thus, syringe pipes such as indicated by the reference numeral 10 in Fig. 1, may be readily molded in one piece by using a novel core 11, which has a base 12, a shank 13, a helically cut portion 14 having a deeply undercut thread 15, and a tip end 16. The pipe is molded in the usual mold, preferably of the split type, about the core, and has the usual shank 17 terminating in a button 18 adapted to receive a rubber tube end, the tip of the pipe having a whirl channel or passageway 19 which leads to an exit 20 for the fluid traversing the spray pipe. The molded article is removed from the mold, and the core is first twisted to free the article and is then pulled out, the resilient article spreading to permit the removal; the article is then cured.

A comparison of Figs. 4 and 5, and 6, clearly discloses that the undercut helical thread on the core produces a corresponding helical passageway or channel in the molded pipe, and that the cross-sectional area of the helical passageway is of different shape and of different size than the core end which must be drawn through the passageway. While the illustrated pipe has a straight shank passage and a straight end passage, as illustrated in Fig. 7, the pipe may be curved if desired; the term linear passageway as used in the claims is intended to include either form.

Referring to Fig. 7, the tip may be curved by utilizing a curved mold and a correspondingly curved core. The core is withdrawn by first twisting to free the article, the resilient article spreading to permit the removal; the article is then cured, as in the case of the straight spray pipe.

It is thus evident that the spray pipe is made as a unitary part complete with a whirl imparting passageway, whereby the manufacturing costs are greatly reduced, forming an assembling of separate parts are eliminated, and uniformity of flow control for the pipe is obtained.

While I have described a specific constructional embodiment of my invention, desired changes in the shape of the parts, in the material used, and in the relative arrangement of the parts may be made to suit the requirements for different spray pipes, within the spirit and the scope of the invention as defined in the appended claims.

I claim:

1. A molded one piece article having a fluid passageway comprising a helical channel and linear portions on each side thereof.

2. In a spray pipe, a tip having a fluid passageway comprising a helical channel and linear portions on each side thereof.

3. In a spray pipe, a tip having a fluid passageway comprising a helical channel and linear portions on each side thereof, the other end of said spray pipe having a tubing receiving portion.

WILLIAM F. DRAY.